Patented Aug. 26, 1952

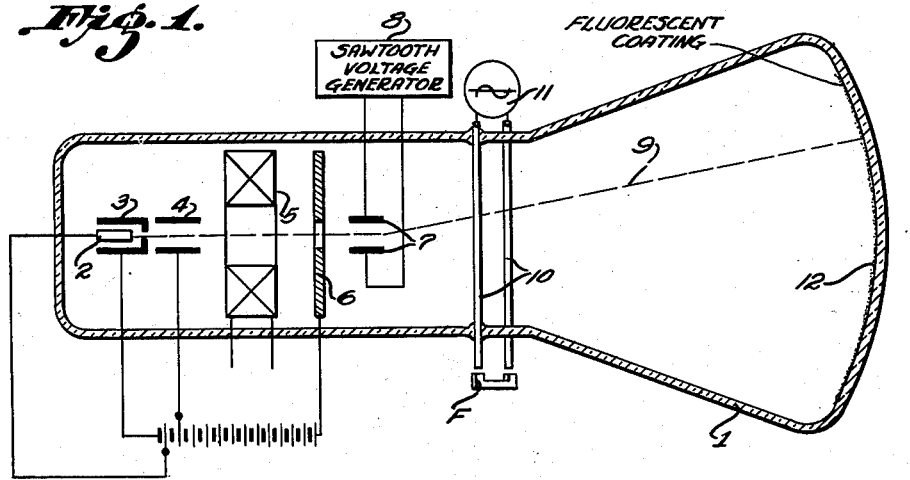
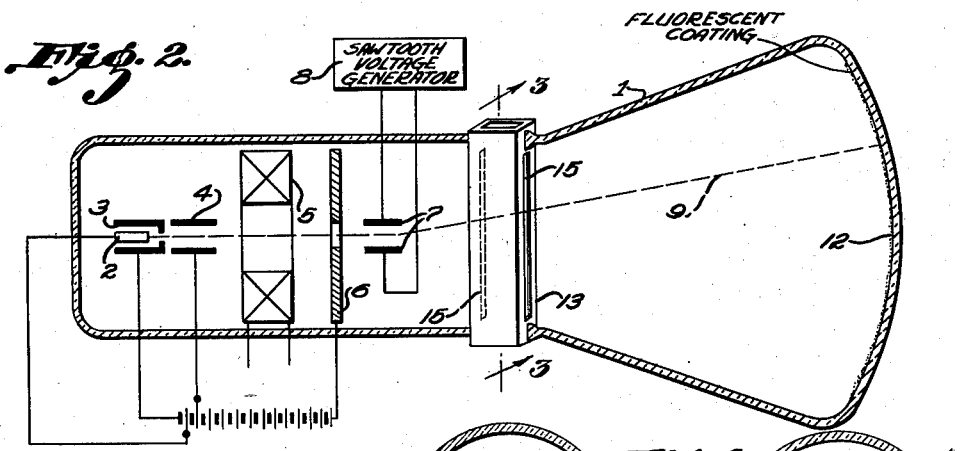
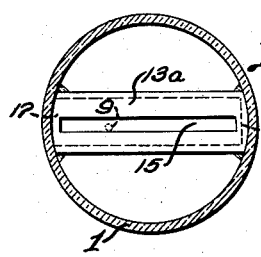
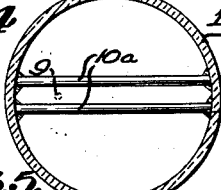

2,608,669

UNITED STATES PATENT OFFICE 2,608,669

CATHODE-RAY TUBE WAVEMETER

Hyman Hurvitz, Washington, D. C., assignor, by mesne assignments, to Marcel Wallace, doing business as Panoramic Laboratories, East Portchester, Conn.

Application February 6, 1948, Serial No. 6,625

1 Claim. (Cl. 315—5)

This invention relates generally to wave meters and more particularly to wave meters in which the character of a wave under investigation is investigated by applying the wave directly to cause deflection of an exploratory beam of electrons.

Wave meters of the type generally known to the prior art measure the wave length of electromagnetic energy by determining the tuning of a circuit, which, when subjected to the waves, provides maximum response thereto. In operation the circuit must be tuned over a range of values, in order to discover the frequency of maximum response, which is, in itself, a time consuming process. Further, the circuit must be calibrated, for accurate work, and this calibration is subject to variation with time and with ambient conditions. The structures adaptable for use at ultra high frequencies, say of the order of 1 to 30 centimeters, are expensive of construction, cumbersome and slow in use, and generally unadapted for rapid measurement.

In the practise of the present invention the wave of electromagnetic energy to be studied is coupled to a section of wave guide or to a parallel line transmission line, which may be terminated in either an open or a short circuit, so that standing waves may be set up therein. The line or the guide may be located interiorly of a cathode ray tube oscilloscope, and extend transversely to the path of travel of the electron beam thereof. The cathode ray beam may be caused to scan at a relatively slow rate across the guide or the line, being influenced at each transverse position by the electric field existing therein, and being deflected thereby in a direction transverse to the direction of scanning motion of the beam. If the length of the guide or line is shorter than a ¼ wave length of the electromagnetic energy applied thereto, a null or nodal point will exist as well as maxima of wave energy. Determination of the position of the null or nodal point is equivalent to measurement of the wave length of the applied wave.

If the applied wave has a quarter wave length between two and three times the length of the line or guide, two nulls or nodes will appear and for shorter waves additional nulls or nodes. The system, accordingly, provides a rapid system of measuring wave length over a wide range of values without requiring adjustments of the wave meter, the latter being held merely in coupling relation to the source of energy the frequency of which is to be measured, and providing an immediate and accurate measurement.

The structural details of the system may fall in two classes. In one of the classes the guide or line may extend externally of the envelope of the cathode ray tube, enabling addition of guide or line sections thereto, whereby to extend the range of wave lengths measurable by means of the apparatus. This advantage is, however, accomplished at the cost of rendering the tube more fragile and difficult to manufacture, by reason of the metallic seals required.

The alternative construction envisages a line or guide section located entirely within the tube, and coupled to external sources through the glass of the tube. This embodiment, while not as flexible in use as the preceding embodiment, is relatively simple to manufacture, and is as strong and leakproof as a cathode ray tube of conventional character.

It is, accordingly, an object of the invention, to provide a cathode ray indicator tube containing electrodes which adapt the tube for measuring wave length.

It is a further object of the invention, to provide a wave meter comprising a wave guide or transmission line section located interiorly of a cathode ray tube, and having provisions for utilizing a cathode ray beam for exploring the character of the wave patterns of electromagnetic energy established in the guide or across the transmission line.

The above and still further objects and advantages of the present invention will become evident upon study of the following detailed description of various embodiments thereof, especially when taken in conjunction with the accompanying drawings, wherein:

Figure 1 is a longitudinal section, taken in plan, of a cathode ray tube arranged in accordance with the invention;

Figure 2 is a modification of the invention of Figure 1;

Figure 3 is a detail of Figure 2, representing a section taken on the line 3—3 of Figure 2;

Figure 4 is a modification of the system of Figure 2, shown in transverse section; and Figure 5 is a modification of the system of Figure 1, shown in transverse section.

Referring now to Figures 1 and 2 of the drawings, the reference numeral 1 denotes the glass envelope of a cathode ray tube indicator, having a cathode 2, a control electrode 3, an accelerating electrode 4, a focusing yoke 5, and a magnetic screen 6 by means of which the deflecting electrodes 7 are shielded from the magnetic influence of the yoke 5. The deflecting electrodes 7 are supplied with sawtooth voltages from a source 8, causing the electron beam 9 to trace repetitively a linear path in a plan parallel to the plane of the paper, and to impinge on a fluorescent coating 12.

The structure described above is common to all the various embodiments of the invention.

Turning now specifically to Figure 1 of the drawings, a pair of parallel conductive rods 10 are provided which are spaced by a convenient amount, and which occupy, as a pair, a plane perpendicular to that traced out of the beam 9, which travels therebetween.

The rods 10 extend completely through the envelope of the tube 1, the envelope being sealed at the points of passage. To one end of the transmission line formed by the rods 10 may be coupled, in any desired manner, a source 11 (conventionally shown) of radio frequency energy, the wave length of which it is desired to measure. At the other end of the line may be connected a short circuiting strap F, if desired, or the lines may be left open.

Referring to Figure 5 of the drawings, a structure similar to that of Figure 1 is shown, but with the electrodes 10a located entirely within the envelope 1, the rods 10a being cemented to the interior wall of the envelope 1. In the embodiment of Figure 5, energy from a source of R. F. energy may be coupled by locating one end of the line 10a adjacent the source, coupling taking place by induction through the glass.

In the case of both Figure 1 and Figure 5, the energy applied to the transmission lines 10 or 10a, respectively, will give rise to standing waves across the line, by reason of the totally reflecting termination of the line. The electron beam 9 in tracing between the conductors of the line will be subjected at each point in its passage to an alternating electric field, having a magnitude equal to that of the standing wave at the point. A corresponding deflection of the beam 9 will occur, which will make itself evident as a visible picture of the shape of the wave on the fluorescent material F coated on the face of the tube 1. This picture will contain one or more nodes or nulls, the location of which will be immediately indicative of the wave length of the wave impressed on the lines 10 or 10a, since these nulls or nodes correspond in location with nulls or nodes in the standing wave of electromagnetic energy present on the lines.

Turning now to Figure 2 of the drawings, it will be evident that for the line 10 has been substituted a section of wave guide 13, extending externally of the envelope of the tube 1 at each end thereof, and in sealed relation thereto. The interior passage of the guide 13 itself is sealed at each end by glass windows 14, in accordance with known techniques, in order to keep the envelope 1 air tight, and is further provided with longitudinal slots 15 for permitting passage of the electron beam 9 through the guide, the slots 15 extending from wall to wall of the envelope 1, and being located in the plane of scanning of the beam 9 in response solely to the voltage applied to electrodes 7.

Reference may be had to Figure 4 of the drawings, wherein is illustrated in transverse section a structure similar to that of Figure 2, except that the wave guide section 13a illustrated in Figure 4 does not extend externally of the envelope 1 but is located entirely within the envelope 1. The wave guide section 13a may be closed at one end by a metallic plug 16, and open at the other end 17.

The section 15, on the other hand, may be left open at both ends, and the load end may be plugged by means of a plunger, if desired, or extensions of the guide section 15 may be added, as desired, and as the exigencies of particular situations may demand.

The advantage of the embodiment of Figure 4, with respect to that of Figure 2, is that the envelope and guide sealing problems present in the embodiment of Figure 2 are obviated in the embodiment of Figure 5.

Energy may be coupled to the wave guide section 13a through the envelope 1, merely by holding the open end 17 of the guide 13a adjacent a source of such energy.

While I have described several embodiments of the present invention, it will be clear that modifications of the structure may be resorted to without departing from the true scope of the invention, as defined in the appended claim.

What I claim and desire to secure by Letters Patent of the United States is:

A cathode ray tube wave meter for visually indicating directly the wave length of electromagnetic wave energy deriving from a source of such energy, comprising, means for generating a beam of electrons, a fluorescent viewing screen adapted to provide a visible indication in response to impact by said beam of electrons, means for directing said beam of electrons against said screen, means for sweeping said beam of electrons across said screen in a predetermined path, guiding means for guiding said electromagnetic wave energy in space, said guiding means having an input and a termination at opposite ends thereof, means for coupling said input to said source of wave energy, said termination being of the type which provides total reflection of said wave energy and thereby establishes a standing wave pattern only of said wave energy in said guiding means, said guiding means so located with respect to said path that said beam of electrons sweeps through said standing wave pattern in sweeping in said predetermined path.

HYMAN HURVITZ.

REFERENCES CITED

The following references are of record in the file of this patent:

UNITED STATES PATENTS

| Number | Name | Date |
| --- | --- | --- |
| 2,064,469 | Haeff | Dec. 15, 1936 |
| 2,195,456 | Hollmann | Apr. 2, 1940 |
| 2,266,428 | Litton | Dec. 16, 1941 |
| 2,359,811 | Varian et al. | Oct. 10, 1944 |
| 2,407,707 | Kilgore | Sept. 17, 1946 |
| 2,408,437 | McRae | Oct. 1, 1946 |
| 2,423,078 | Anderson | July 1, 1947 |
| 2,433,044 | Haeff | Dec. 23, 1947 |
| 2,444,073 | Tomlin | June 29, 1948 |
| 2,450,618 | Smullin et al. | Oct. 5, 1948 |